(12) United States Patent
Landers, Jr. et al.

(10) Patent No.: US 11,514,497 B2
(45) Date of Patent: Nov. 29, 2022

(54) METHOD OF USING, APPARATUS, PRODUCT, AND SYSTEM FOR A NO TOUCH POINT-OF-SALE SELF-CHECKOUT

(71) Applicant: Toshiba Global Commerce Solutions Holdings Corporation, Tokyo (JP)

(72) Inventors: John David Landers, Jr., Raleigh, NC (US); Dean Frederick Herring, Youngsville, NC (US); Brad Matthew Johnson, Raleigh, NC (US); Jeffrey John Smith, Raleigh, NC (US); David John Steiner, Raleigh, NC (US); Phuc Ky Do, Morrisville, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 247 days.

(21) Appl. No.: 17/010,456

(22) Filed: Sep. 2, 2020

(65) Prior Publication Data
US 2020/0402130 A1    Dec. 24, 2020

Related U.S. Application Data

(63) Continuation of application No. 16/201,194, filed on Nov. 27, 2018, now Pat. No. 10,825,068, which is a
(Continued)

(51) Int. Cl.
*G06Q 30/06* (2012.01)
*G07G 1/00* (2006.01)
(Continued)

(52) U.S. Cl.
CPC ......... *G06Q 30/0623* (2013.01); *G01B 11/00* (2013.01); *G01G 19/4144* (2013.01);
(Continued)

(58) Field of Classification Search
CPC ...... G06V 40/10; G06V 40/179; G06V 10/40; G06V 40/172; G06V 40/16; G06V 40/166;
(Continued)

(56) References Cited

U.S. PATENT DOCUMENTS

| | | | |
|---|---|---|---|
| 6,292,827 B1 * | 9/2001 | Raz | H04L 9/40 709/219 |
| 6,601,762 B2 | 8/2003 | Piotrowski | |

(Continued)

OTHER PUBLICATIONS

Datalogic, "JADETM X7", http://www.ampmsystems.com/wp-content/uploads/2014/04/Datalogic_Data-Shee- t_Jade.pdf.
(Continued)

*Primary Examiner* — Andrew Joseph Rudy
(74) *Attorney, Agent, or Firm* — Patterson + Sheridan, LLP (57) ABSTRACT

A method, computer program product, and system to perform a sale transaction are provided. The method includes identifying each item of a plurality of items, based on at least one image of the plurality of items, determining a cost for each item, optionally identifying a person based on an image of the person, adding each of the items and each of the costs to a sale transaction, and charging the person for the sale transaction.

20 Claims, 7 Drawing Sheets

Related U.S. Application Data continuation of application No. 14/883,178, filed on Oct. 14, 2015, now Pat. No. 10,157,413.

(60) Provisional application No. 62/064,323, filed on Oct. 15, 2014.

(51) Int. Cl.

| | | |
|---|---|---|
| *G06Q 20/20* | (2012.01) | |
| *G06Q 10/08* | (2012.01) | |
| *G06T 7/66* | (2017.01) | |
| *G01B 11/00* | (2006.01) | |
| *G01G 19/414* | (2006.01) | |
| *G01S 19/13* | (2010.01) | |
| *G06F 1/16* | (2006.01) | |
| *G06F 3/01* | (2006.01) | |
| *G06K 9/00* | (2022.01) | |
| *G06K 9/62* | (2022.01) | |
| *G06Q 20/18* | (2012.01) | |
| *G06Q 30/00* | (2012.01) | |
| *G06Q 30/02* | (2012.01) | |
| *G06T 11/60* | (2006.01) | |
| *H04N 5/225* | (2006.01) | |
| *H04N 5/232* | (2006.01) | |
| *H04N 7/18* | (2006.01) | |
| *G06V 10/10* | (2022.01) | |
| *G06V 10/40* | (2022.01) | |
| *G06V 10/147* | (2022.01) | |
| *G06V 20/00* | (2022.01) | |
| *G06V 20/80* | (2022.01) | |
| *G06V 40/10* | (2022.01) | |
| *G06V 40/16* | (2022.01) | |
| *G06Q 20/32* | (2012.01) | |
| *G01G 19/40* | (2006.01) | |
| *G01B 11/02* | (2006.01) | |
| *G06V 20/68* | (2022.01) | |

(52) U.S. Cl.
CPC ............. *G01S 19/13* (2013.01); *G06F 1/163* (2013.01); *G06F 3/012* (2013.01); *G06F 3/013* (2013.01); *G06K 9/00536* (2013.01); *G06K 9/6201* (2013.01); *G06K 9/6267* (2013.01); *G06Q 10/087* (2013.01); *G06Q 20/18* (2013.01); *G06Q 20/204* (2013.01); *G06Q 20/208* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G06T 7/66* (2017.01); *G06T 11/60* (2013.01); *G06V 10/10* (2022.01); *G06V 10/147* (2022.01); *G06V 10/40* (2022.01); *G06V 20/00* (2022.01); *G06V 20/80* (2022.01); *G06V 40/10* (2022.01); *G06V 40/16* (2022.01); *G06V 40/166* (2022.01); *G06V 40/172* (2022.01); *G07G 1/0045* (2013.01); *G07G 1/0054* (2013.01); *G07G 1/0063* (2013.01); *G07G 1/0072* (2013.01); *H04N 5/225* (2013.01); *H04N 5/232* (2013.01); *H04N 7/181* (2013.01); *G01B 11/02* (2013.01); *G01G 19/40* (2013.01); *G06T 2207/30232* (2013.01); *G06V 20/68* (2022.01); *G06V 40/179* (2022.01)

(58) Field of Classification Search
CPC ...... G06V 20/80; G06V 10/10; G06V 10/147; G06V 20/00; G06V 20/68; G01G 19/4144; G01G 19/40; G01G 19/414; G06Q 10/087; G06Q 30/0629; G06Q 30/0235; G06Q 30/0631; G06Q 30/0251; G06Q 30/0224; G06Q 20/209; G06Q 30/0269; G06Q 30/0635; G06Q 30/0623; G06Q 20/18; G06Q 20/208; G06Q 20/322; G06Q 30/0609; G06Q 30/0633; G06Q 30/016; G06Q 30/06; G06Q 10/08; G06Q 30/00; G06Q 30/02; G06Q 20/32; H04N 5/232; H04N 5/225; H04N 7/181; H04N 7/18; G06T 11/60; G06T 2207/30232; G06T 7/66; G01B 11/02; G01B 11/00; G01S 19/13; G06F 3/012; G06F 3/013; G06F 1/163; G06F 1/16; G06F 3/01; G06K 9/6201; G06K 9/6267; G06K 9/00536; G06K 9/00; G06K 9/20; G06K 9/46; G06K 9/62; G06K 9/78; G07G 1/0054; G07G 1/0045; G07G 1/0072; G07G 1/00

USPC ....................... 705/17; 235/379–383, 462.11

See application file for complete search history.

(56) References Cited

U.S. PATENT DOCUMENTS

| | | | |
|---|---|---|---|
| 6,726,094 B1 | 4/2004 | Rantze et al. | |
| 7,194,327 B2* | 3/2007 | Lam | A41H 3/007 700/134 |
| 7,246,745 B2 | 7/2007 | Hudnut et al. | |
| 7,503,490 B1 | 3/2009 | Bobbitt et al. | |
| 7,631,808 B2 | 12/2009 | Kundu et al. | |
| 7,697,551 B2* | 4/2010 | Stephen | H04M 7/0045 370/352 |
| 7,896,235 B2* | 3/2011 | Ramachandran | G06Q 20/3572 235/379 |
| 7,909,248 B1 | 3/2011 | Goncalves | |
| 8,015,071 B2* | 9/2011 | Crespo | G06Q 30/06 705/26.1 |
| 8,229,158 B2 | 7/2012 | Connell, II et al. | |
| 8,317,086 B2 | 11/2012 | Dudek et al. | |
| 8,418,919 B1 | 4/2013 | Beyda | |
| 8,494,909 B2 | 7/2013 | Goncalves | |
| 8,561,889 B2* | 10/2013 | Block | G06Q 20/4014 235/375 |
| 8,732,024 B2 | 5/2014 | Jacobs | |
| 8,746,557 B2 | 6/2014 | Connell, II et al. | |
| 8,856,034 B2 | 10/2014 | Abraham | |
| 8,876,001 B2 | 11/2014 | Herwig et al. | |
| 9,171,442 B2 | 10/2015 | Clements | |
| 9,202,105 B1 | 12/2015 | Wang et al. | |
| 9,563,906 B2* | 2/2017 | Stark | G06Q 30/0281 |
| 9,679,327 B2 | 6/2017 | Herring et al. | |
| 9,984,362 B2 | 5/2018 | Aidasani et al. | |
| 10,157,413 B2 | 12/2018 | Landers, Jr. et al. | |
| 10,360,604 B2* | 7/2019 | Soldate | H04W 88/02 |
| 10,636,027 B2* | 4/2020 | Cyr | G06Q 20/204 |
| 10,672,051 B2 | 6/2020 | Herring et al. | |
| 10,685,379 B2* | 6/2020 | Purves | G06Q 20/3224 |
| 11,017,462 B2* | 5/2021 | Zhao | G06Q 30/0643 |
| 11,042,887 B2* | 6/2021 | Sorensen | G06Q 30/0201 |
| 11,151,544 B2* | 10/2021 | Grabovski | G06Q 30/0207 |
| 2003/0018897 A1 | 1/2003 | Bellis et al. | |
| 2005/0247797 A1 | 11/2005 | Ramachandran | |
| 2010/0086192 A1 | 4/2010 | Grigsby et al. | |
| 2012/0127314 A1 | 5/2012 | Clements | |
| 2013/0054367 A1* | 2/2013 | Grigg | G06Q 30/0207 705/14.58 |
| 2013/0254114 A1 | 9/2013 | Smith | |
| 2014/0006128 A1* | 1/2014 | Grigg | G06Q 30/0253 705/14.23 |

(56) References Cited

U.S. PATENT DOCUMENTS

| | | | |
|---|---|---|---|
| 2014/0006165 A1* | 1/2014 | Grigg | G06Q 30/0281 |
| | | | 705/14.64 |
| 2014/0021258 A1 | 1/2014 | Olmstead | |
| 2014/0036630 A1 | 2/2014 | Herwig | |
| 2014/0222596 A1 | 8/2014 | S | |
| 2015/0025969 A1* | 1/2015 | Schroll | G06Q 20/208 |
| | | | 705/14.64 |
| 2016/0110793 A1 | 4/2016 | Herring | |
| 2019/0096198 A1 | 3/2019 | Landers, Jr. et al. | |

OTHER PUBLICATIONS

Datalogic LaneHawk, "Product Recognition & Bottom of Basket (BOB) Detection", http://www.ampmsystems.com/solutions/hardware/lanehawk/.

Grocery Headquarters, "A 360 Checkout Solution", http://www.groceryheadquarters.com/2012/02/a-360-checkout-solution/.

Wincor Nixdorf, "Automatic Scanning", http://www.wincor-nixdorf.com/internet/cae/servlet/contentblob/1247842/pu-blicationFile/83758/Broschuere-download.pdf.

* cited by examiner

METHOD OF USING, APPARATUS, PRODUCT, AND SYSTEM FOR A NO TOUCH POINT-OF-SALE SELF-CHECKOUT

CROSS-REFERENCE TO RELATED APPLICATIONS

This application is a continuation of co-pending U.S. patent application Ser. No. 16/201,194 filed on Nov. 27, 2018, which is a continuation of U.S. patent application Ser. No. 14/883,178 filed on Oct. 14, 2015 (and which has since issued as U.S. Pat. No. 10,157,413), which claims benefit of U.S. provisional patent application Ser. No. 62/064,323, filed Oct. 15, 2014, entitled "Integrated Shopping Environment". These applications are herein incorporated by reference in their entirety.

BACKGROUND

The present disclosure relates to techniques for checking out at a retail store, and more specifically, to automated techniques for simultaneously identifying a customer and items presented for purchase.

In some stores, items presented when a customer is checking out are identified by a bar-code reader that reads a bar-code of the item and identifies the item. In many of these stores, a customer or store associate presents the items serially (i.e., one at a time) to the bar-code reader. Items without bar-codes (e.g., grapes) are identified by a person, who inputs the identification into a check-out system (e.g., a cash register).

In some other stores, items are placed in a scan tunnel system that may identify items without requiring a person (e.g., a customer or store associate) to present each item individually. In current scan tunnel systems for checking out customers, many cameras are utilized to increase the likelihood that items are successfully identified by at least one camera. Multiple (e.g., two to four) belts may also be used to reorient items during scanning. In these scan tunnel systems, the items are identified serially as each item passes through a scanning zone. Multiple cameras and belts increase the cost of these tunnel systems. In addition, the items being purchased must still be transferred by the customer or a store associate from the customer's basket to the scan tunnel belt. Further, items are sometimes not identified by the scan tunnel system, requiring that a person (e.g., a store associate) intervene to identify the item and allow completion of the transaction.

Therefore, there is a need for continuing to improve the customer experience, expedite checkout and minimize intervention from store personnel.

To facilitate understanding, identical reference numerals have been used, where possible, to designate identical elements that are common to the figures. Elements disclosed in one embodiment may be utilized with other embodiments. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the disclosure relate to automated techniques for identifying and items presented for purchase and optionally identifying a customer associated with purchasing the items. According to aspects of the disclosure, a retailer may use a point of sale (POS) system with one or more visual sensors to simultaneously identify items presented for purchase and the purchaser. The POS system may utilize a camera to identify all of the items in a basket or bag simultaneously, which may reduce item recognition time compared to scanning items serially using automated or manual systems. In parallel with identifying the items, facial recognition software may be used to identify the customer, and the POS system may use information regarding the identified customer in adding loyalty, payment, and receipt information to the transaction. The POS system may use a weighted security algorithm in verifying that nothing unexpected is in the basket or bag. The POS system may then perform payment authentication and produce a receipt (e.g., by generating an email to the customer, generating a text message to the customer, or causing a printer to print a receipt). The customer can then exit the store. The POS system may utilize cameras throughout the store to identify customers, identify items, interpret behaviors of customers, and build transactions while a customer is shopping.

Figure 1:
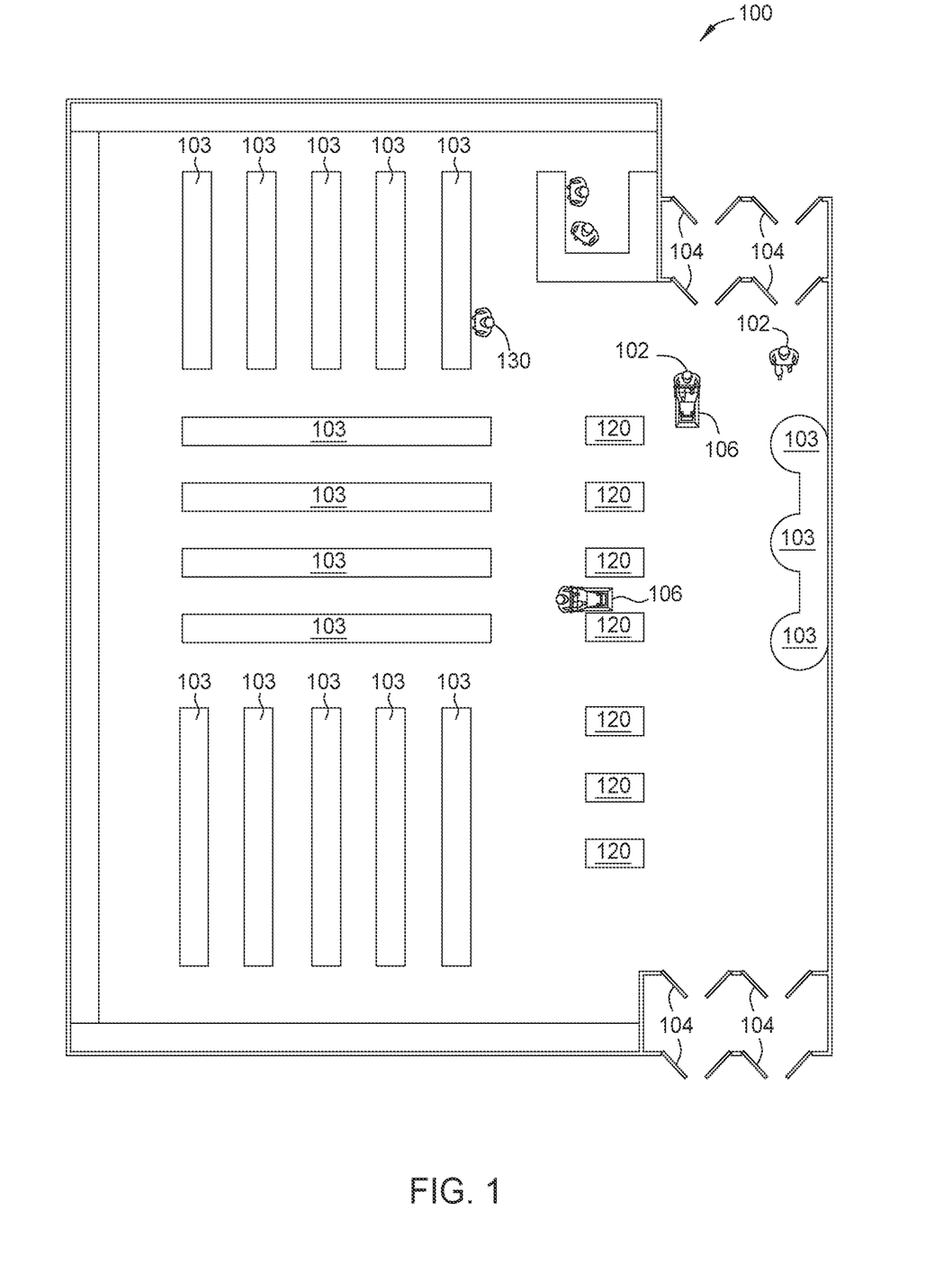
FIG. 1 is a plan view of an exemplary store, according to embodiments of the present disclosure.

FIG. 1 is a plan view of a store 100, according to embodiments of the disclosure. Customers 102a through 102f may enter the store through one of the doors 104. A customer may select items for purchase from shelving units 103 and place the selected items in a cart 106 or basket. When the customer is done selecting items and ready to pay for the items, the customer can proceed to a point of sale (POS) terminal 120 located at a checkout position in the store. The POS terminal identifies each of the selected items (e.g., by scanning a bar-code), determines a price for each of the items, generates a record of the transaction, and may accept payment (e.g., a credit card payment) for the transaction. The customer may also be identified (e.g., by presentation of a loyalty card) by the POS terminal, and the POS terminal may alter the transaction (e.g., by applying one or more discounts) based on the identity of the customer. When the customer has completed the transaction and is ready to leave the store, the customer exits through one of the doors 104.

To provide a seamlessly integrated environment that is personalized for a number of different customers, differentiation and identification of specific customers may be important. Identification of customers may begin prior to the customers' shopping experience, at checkout, and/or may be tracked throughout the shopping experience. As described above, a customer may register their shopping event by scanning a loyalty program card at a kiosk or terminal. However, program cards can easily be misplaced or forgotten.

Various elements included within the shopping environment each have some functionality that is capable of capturing one or more aspects of customers' likenesses or behaviors. When these various aspects are captured, the information may be used to distinguish and identify specific customers. For example, the shopping environment may include a plurality of visual sensors disposed throughout, a plurality of kiosks or checkout lanes that include cameras, video sensors, or other sensors that all may be used to capture aspects of customers' likenesses.

Identification of customers may occur as a discrete registration and/or check-in event, such as a customer approaching a kiosk to check in. Generally, a customer may have their face oriented towards the kiosk and to visual sensors included therein. The video sensor may capture an image of the customer's face, and process the image locally or send it to another networked computing device (e.g., server) to process the image and compare against a customer database. Of course, other identifying features may also be captured by the sensors (such as body dimensions, weight, gait, voice) that may be compared to suitably identify customers.

In some embodiments, customers may be identified when entering the shopping environment. For example, as a customer enters a store, the customer may login to a store app on a mobile computing device, and an embedded camera in the device or a video sensor within the store captures one or more images that are processed to determine the customer's face or other identifying features and to compare against the database.

If a match is made with the database, the identified customer may have their shopping experience tracked, may have preferences applied or savings indicated or applied automatically. If a match is not made, the unidentified customer may be offered to join the loyalty program. In any event, the unidentified customer may still be registered in the database for recognition on subsequent shopping visits. In some cases, the registration of the unidentified customer occurs without storing personal information beyond the captured image(s). In other cases, quantified aspects of the image(s) or other traits may be stored.

Figure 2:
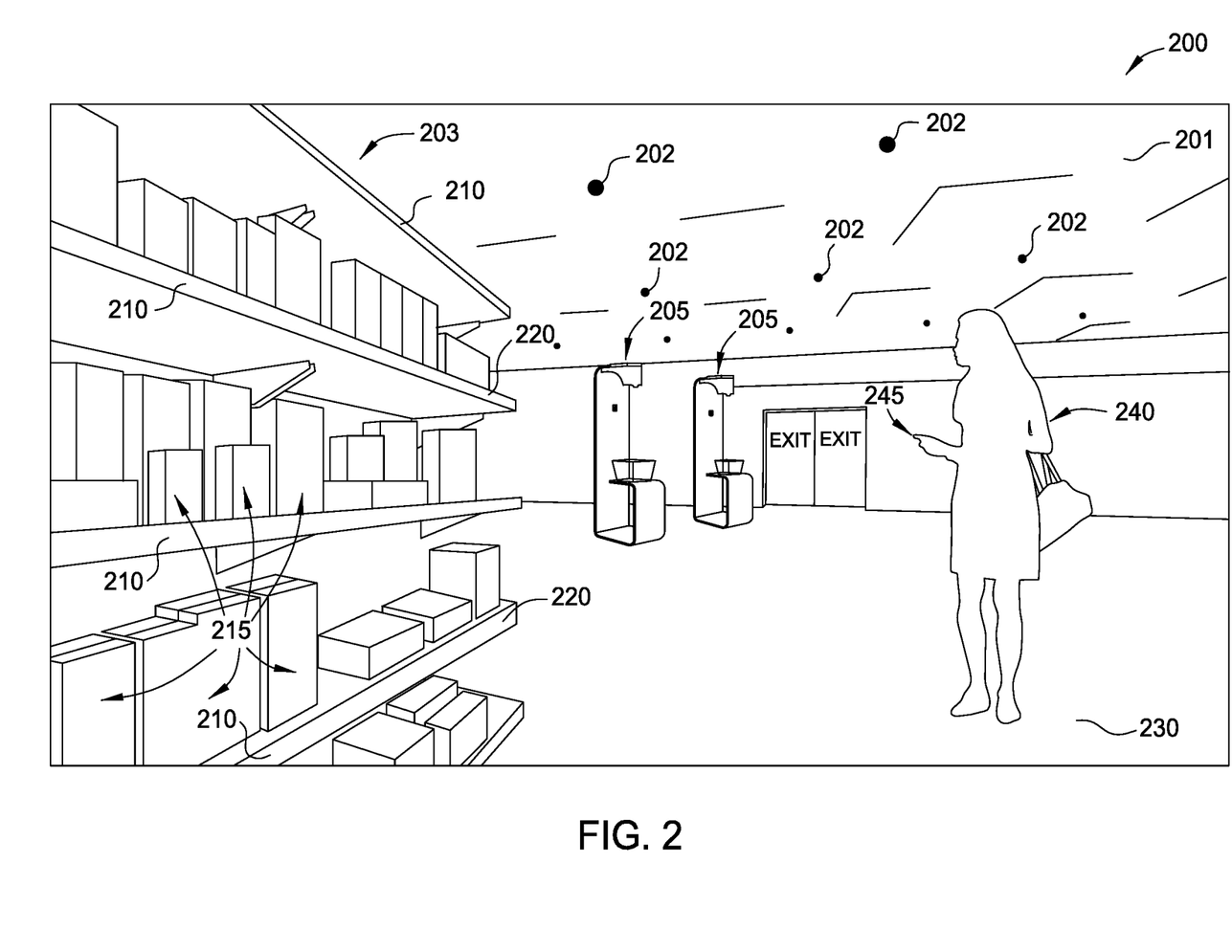
FIG. 2 illustrates a portion of an exemplary store depicting shelves, POS terminals and an exit to the store, according to embodiments of the present disclosure.

FIG. 2 illustrates a portion of an exemplary store 200 depicting shelves, POS terminals and an exit to the store, according to aspects of the present disclosure. Store 200 includes shelving units 203 with shelves 210 and items 215 that are available for selection, purchase, etc. Multiple shelving units 203 may be arranged in the store 200 to form aisles through which customers may navigate.

The store 200 includes a plurality of sensor modules 202 disposed in the ceiling 201. A POS system of the store 200 may use information gathered by sensor modules in determining items being purchased by a customer. For example, a POS system may receive imagery of a customer placing a box of corn flakes in the customer's basket and store a record that the customer picked up the box of corn flakes for use (e.g., as a reference) when the customer is checking out. Each sensor module 202 may include one or more types of sensors, such as visual sensors (e.g., cameras), audio sensors (e.g., microphones), and motion sensors. Sensor modules 202 may also include actuating devices for orienting the sensors. Sensor modules or individual sensors may generally be disposed at any suitable location within the store 200. Some non-limiting examples of alternative locations include below, within, or above the floor 230, within other structural components of the store 200 such as a shelving unit 203 or walls. In some embodiments, sensors may be disposed on, within, or near product display areas such as shelving unit 203. The sensors may also be oriented toward an expected location of a customer interaction with items, to provide data about the interaction, such as determining the customer's actions.

Store 200 also includes a number of POS terminals (e.g., kiosks) 205. Each POS terminal 205 may include computing devices or portions of computing systems, and may include various I/O devices, such as visual displays, audio speakers, cameras, microphones, key pads, and touchscreens for interacting with the customer. According to aspects of the disclosure, a POS terminal 205 may identify items a customer is purchasing, for example, by determining the items from images of the items.

In some aspects of the present disclosure, a customer 240 may have a mobile computing device 245 (e.g., a smartphone) that communicates with the POS terminal 205 to complete a transaction. In aspects of the present disclosure, the mobile computing device may execute a store application (e.g., an app) that is connected to networked computing systems using wireless networks accessible within the store (e.g., over Wi-Fi or Bluetooth). In one embodiment, the mobile computing device 245 may communicate with the POS terminal 205 when brought within range, e.g., using Bluetooth or near-field communication (NFC) tags.

In some embodiments, the shelving unit 203 may include attached and/or embedded visual sensors or other sensor devices or I/O devices. The sensors or devices may communicate with networked computing devices within the store 200. A POS system may use information gathered by sensors on a shelving unit to determine items being purchased by a customer. For example, the front portions 220 of shelves 210 may include video sensors oriented outward from the shelving unit 203 to capture customer interactions with items 215 on the shelving unit 203, and the data from the video sensors may be provided to a POS system for use in determining items in the customer's basket when the customer is checking out.

A POS system of the store 200 may utilize sensor modules 202 to build a transaction for customer 240. The POS system may recognize various items 215 picked up and placed in a bag or basket by the customer 240. The POS system may also recognize the customer 240, for example, by recognizing the customer's face or a mobile computing device 245 carried by the customer 240. The POS may associate each item 215 picked up by the customer 240 with the customer 240 to build a transaction for the customer 240.

Figure 3:
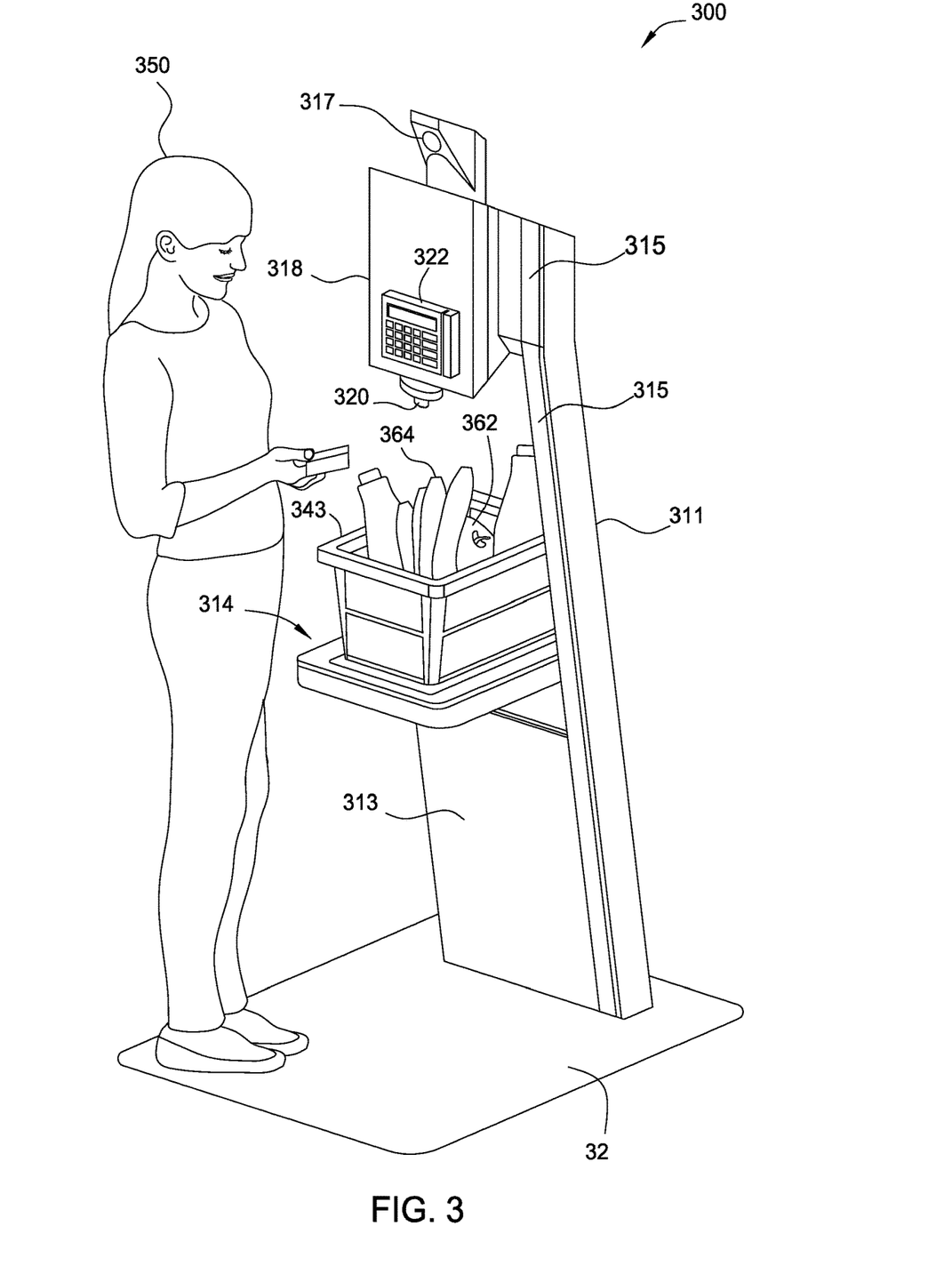
FIG. 3 illustrates an exemplary POS terminal, according to embodiments of the present disclosure.

FIG. 3 illustrates an exemplary POS terminal 300, according to one embodiment of the present disclosure. POS terminal 300 is generally similar in structure and function to POS terminal 205. POS terminal 300 includes a base portion 312, one or more vertical portions 311, 313, a support member 314 for supporting a shopping basket 343, and a credit card reader 322. POS terminal 300 includes a camera 320 oriented for identifying store items in a shopping basket 343. POS terminal 300 may include a touchscreen or display 318 and camera 317 that are generally oriented toward customers using the POS terminal, e.g., customer 350. Vertical portion 311 may also include a plurality of indicator lights 315.

In some embodiments of the present disclosure, the camera 320 may be oriented such that it can view both items in the shopping basket 343 and a customer 350 using the POS terminal 300. The camera 320 may be oriented to view items in the shopping basket 343 and a customer using the POS terminal 300 by placing the camera 320 high on the POS terminal 300, using a motor to move the camera 320 to change the viewpoint of the camera 320, or supplying the camera 320 with a wide-angle lens.

The support member 314 may have markings indicating where the basket 343 should be positioned during operation of the POS terminal 300. Similarly, the display 318 may present messages to assist a customer in positioning the basket 343. Indicator lights 315 may also be used to indicate proper or improper basket positioning on support member 314. The support member 314 may also include a scale for determining the weight of the basket 343. The weight of the basket may be used in identifying items within the basket 343.

According to aspects of the present disclosure, a POS system may simultaneously identify items 362, 364 in the basket 343 and the customer 350. The POS system may identify the items 362, 364 based on one or more images of the items captured by the cameras 317, 320. The POS system may identify the items based on barcodes, quick response (QR) codes, reflected light, colors, sizes, weight ranges, packaging dimensions, packaging shapes, and graphical design of the items. For example, a POS system may capture an image of basket 343 using camera 320. The POS system may determine that item 364 is a bag of chips based on a bar-code in the image, and item 362 is an apple, based on its color in the image and its weight, which is determined by the scale in support member 314.

The POS system may identify the customer 350 based on an image of the customer captured by cameras 317 and/or 320 (e.g., by use of facial recognition software), based on a mobile computing device carried by the customer (e.g., based on an app running on the customer's smartphone), based on the customer's voice (e.g., using voice recognition software), and/or based on a gesture made by the customer (e.g., captured using a touch-capable implementation of the display 318 at the POS terminal 300). For example, a POS system may receive an image of customer 350 from camera 317 on POS terminal 300, and the POS system may use facial recognition software with the image to determine that customer 350 is Susan Jones.

Upon identifying the items in basket 343 and the customer 350, the POS system may charge the customer 350, produce a receipt (e.g., by printing or e-mailing the receipt) for the customer 350, and indicate to the customer 350 (e.g. by playing a sound through a speaker) that the transaction is complete. For example, a POS system identifies a bag of chips and an apple in basket 343 from an image of basket 343. In the example, the POS system also identifies customer 350 as Susan Jones. Still in the example, the POS system looks up a credit card for Susan Jones from stored profile information, charges the credit card, emails a receipt to the email address in Susan Jones' profile, and plays a message saying "Thank you for shopping with us, Ms. Jones" through a speaker in the POS terminal.

While the foregoing operation of the POS system is described in terms of identifying two items, the disclosed embodiments are not so limited and are capable of identifying larger numbers of items.

According to embodiments of the present disclosure, a POS system may require two-factor authentication in order to accept payment and complete a transaction. The POS system may require a person to have one factor and to know one factor in order to complete the two-factor authentication.

A POS system may accept, for example, recognition of an image of a face obtained via a camera, recognition of a voice obtained via a microphone, recognition of a mobile computing device (e.g., recognizing a physical medium access control (MAC) address of a wireless device) obtained via a wireless network receiver, or recognition of a credit card obtained via a credit card reader as a first factor in the two-factor authentication. That is, the POS system may accept recognition of something that a known person would have (e.g., a face, a voice, a personal smart phone, or a credit card) as the first factor in authenticating a person as the known person.

As a second factor in authenticating a person, a POS system may accept recognition of something that a known person would know. For example, a POS system may accept a spoken pass-code obtained via a microphone, signing of a signature on a touch screen, entry of a personal identification number on a keyboard, or entry of a pass-code gesture on a touchscreen as a second factor in authenticating a person as the known person.

Figure 4:
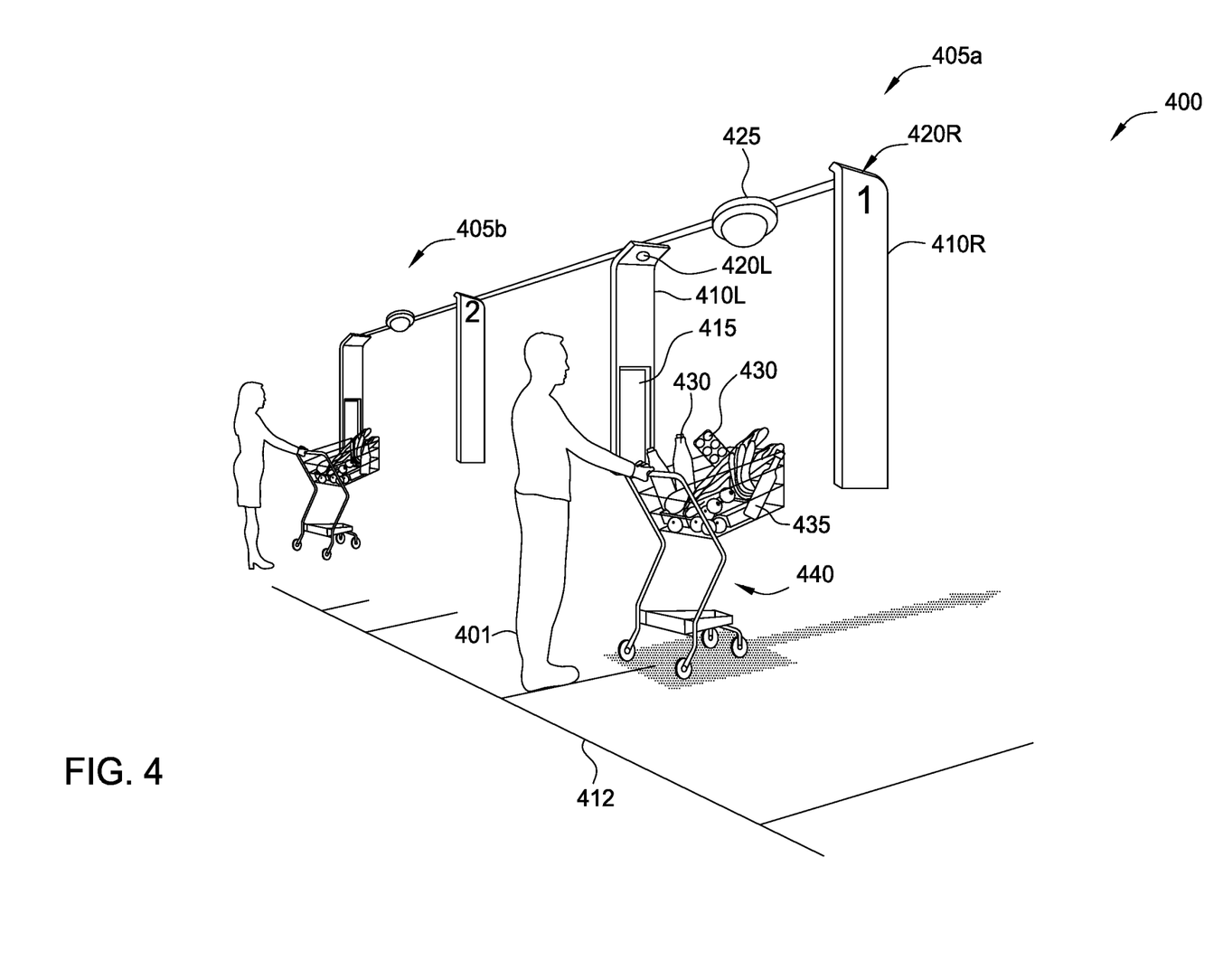
FIG. 4 illustrates an exemplary checkout area with multiple POS terminals, according to embodiments of the present disclosure.

FIG. 4 illustrates an exemplary checkout area 400, according to one embodiment of the present disclosure. Checkout area 400 may be associated with or be a part of store 100 or store 200. Checkout area 400 includes two exemplary checkout lanes 405a and 405b, but other numbers of checkout lanes are included in the scope of the disclosure.

Each checkout lane may include a plurality of dividers 410L, 410R that bound each checkout lane. While the checkout lanes are shown with dividers, the dividers are optional, and checkout lanes may be bounded by markings on the floor or other means. As shown, the dividers 410L, 410R are attached to framing in the ceiling, but alternative embodiments may have one or more dividers attached to the floor or free-standing.

One or more of the dividers 410L, 410R may include input/output devices for customer interaction, such as a display 415. Other input/output devices such as audio speakers, a touchscreen, a keypad, a microphone, etc. may also be included.

The dividers may include cameras 420L, 420R for capturing images of items 430 included in shopping cart 440. The cameras 420L, 420R may be oriented toward an expected position of the shopping cart 440, such as relative to a segment of lane lines 412. The images may be analyzed based on properties of the items 430, as well as labeling such as barcodes 435. A separate camera 425 may be included in a checkout lane 405 for capturing additional images of the items 430 and/or images of the customer 401. A POS system may analyze the images of the items 430 to determine the items being purchased by the customer 401. For example, a POS system may determine the items being purchased by scanning one or more images and reading a bar-code on an item, reading a quick reference (QR) code from an item, reading a label from an item, and/or looking up the color, size, or shape of the item in a database of store items. A POS system may also combine the previously mentioned techniques and use incomplete information from a technique, either alone or in combination with another technique. For example, a POS system may read a partial bar-code and determine a color of an item from one or more images, then determine the item by looking up the partial bar-code in a database and determining a group of items matching the partial bar-code, and then using the determined color to select one item from the group. In a second example, a POS system may read a partial bar-code from an item, look up the partial bar-code in a store inventory database, and determine that only item in the inventory database matches the partial bar-code. A POS system may also use information provided from other types of sensors to determine items being purchased. For example, a POS system may include radio-frequency identification (RFID) scanners and determine items being purchased by scanning RFID chips included in the items.

As with the POS terminal 300, images of the customer 401 may be used by a POS system to identify the customer. Identifying the customer may allow association of the transaction with an associated stored profile of the customer. Identifying the customer may also be used in completing a transaction (e.g., the purchase of goods by the customer).

According to aspects of the present disclosure, a customer 401 may push a shopping cart 440 of items 430 through a checkout lane 405. A POS system may identify all of the items 430 in the shopping cart 440, based on images of the items captured by cameras 420L, 420R, and/or 425. The POS system determines prices of the identified items (e.g., by looking up the items in a database) and adds the items and prices to a transaction. The POS system may also identify the customer 401, based on one or more images of the customer captured by the cameras 420L, 420R, and/or 425. The POS system may authenticate the customer 401 by the customer speaking a pass-code, signing a signature, entering a PIN, or gesturing a pass-code. The POS system may then charge the customer 401 for the transaction, produce (e.g., by e-mailing or sending by text message) a receipt, and signal (e.g., by lighting a green indicator light) the customer 401 that the transaction is complete.

A POS system may use information gathered by other sensors in a store in identifying items. For example, customer 240 and customer 401 may be the same customer. In the example, a POS system may use sensors 202 to capture images of customer 240 selecting items 215 for purchase. Still in the example, the POS system uses the captured images to identify items 430 as the customer 401 walks through the checkout lane 405.

Figure 5:
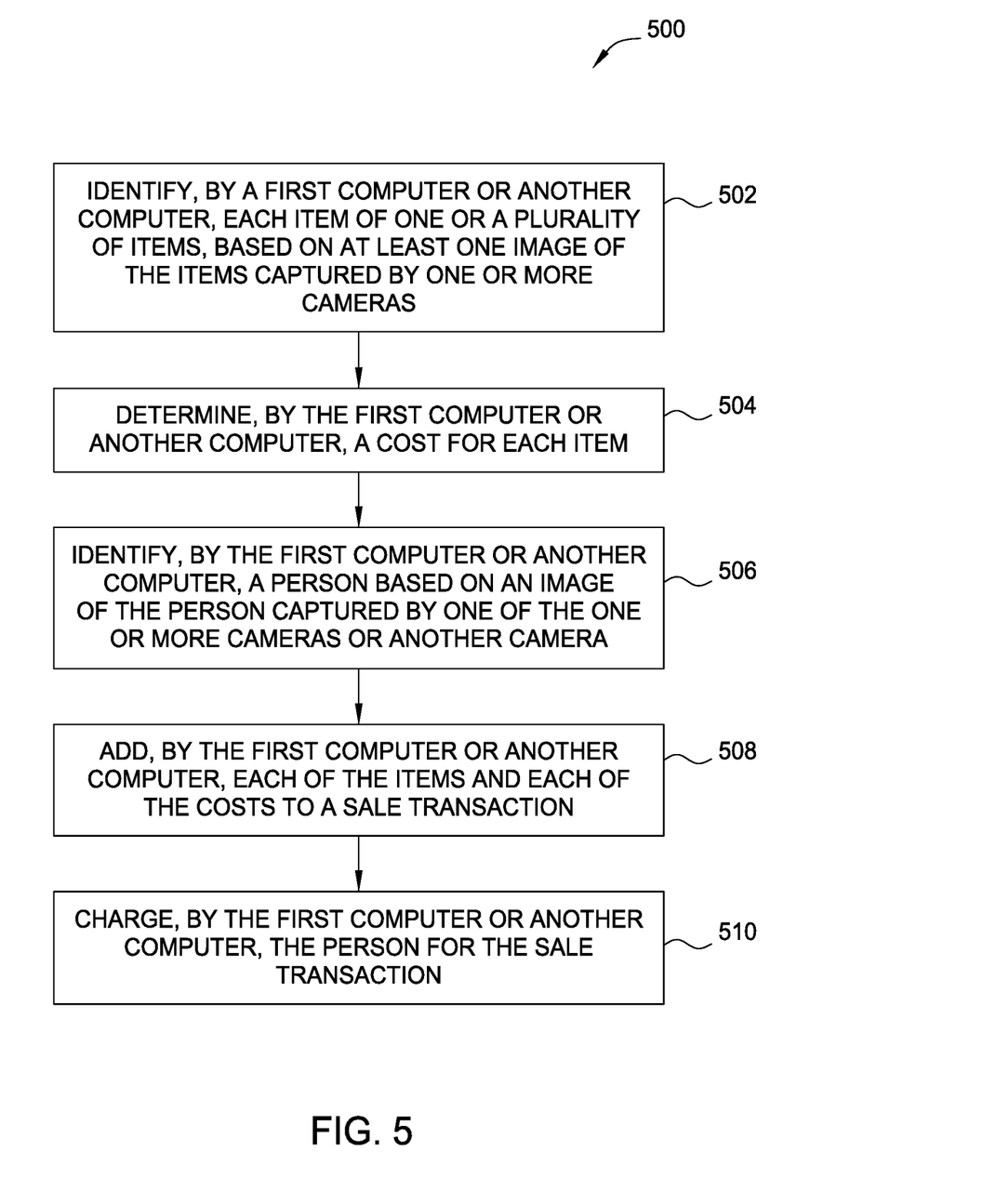
FIG. 5 is a flow diagram illustrating an exemplary method for performing a sale transaction, according to aspects of the present disclosure.

FIG. 5 illustrates an exemplary method 500 for performing a sale transaction, according to aspects of the present disclosure. Method 500 may be performed by a POS system, for example POS system 700 shown in FIG. 7, in completing the sales described above with reference to FIGS. 3-4.

Method 500 begins at block 502, wherein a POS system identifies, by a first computer or another computer, each item of one or a plurality of items, based on at least one image of the items captured by one or more cameras. For example and referring to FIG. 3, a POS system may use a camera 320 to capture an image of items 362 and 364, and identify item 362 as an apple and item 364 as a bag of chips.

Referring again to FIG. 5, at block 504, the POS system determines, by the first computer or another computer, a cost for each item. Continuing the example above, the POS system determines (e.g., from a database) that the apple has a cost of $0.79 and the bag of chips has a cost of $0.59.

Method 500 continues at block 506, wherein the POS system identifies, by the first computer or another computer, a person accompanying the items based on an image of the person captured by one of the one or more cameras or another camera. Continuing the example above, the POS system may use camera 317 to capture an image of the customer 350 and identify the customer 350 as Susan Jones, based on the image.

At block 508, the POS system adds, by the first computer or another computer, each of the items and each of the costs to a sale transaction. Continuing the example above, the POS system adds an apple at a cost of $0.79 and a bag of chips at a cost of $0.59 to a sale transaction.

At block 510, the POS system charges, by the first computer or another computer, the person for the sale transaction. The POS system may charge an account of the customer, post a transaction to a credit card on file for the customer, present a bill at a payment kiosk for the customer, or use other techniques to charge the customer. Continuing the above example, the POS system charges $1.38 ($0.79+ $0.59) for the sale transaction to a credit card on file for Susan Jones.

Figure 6:
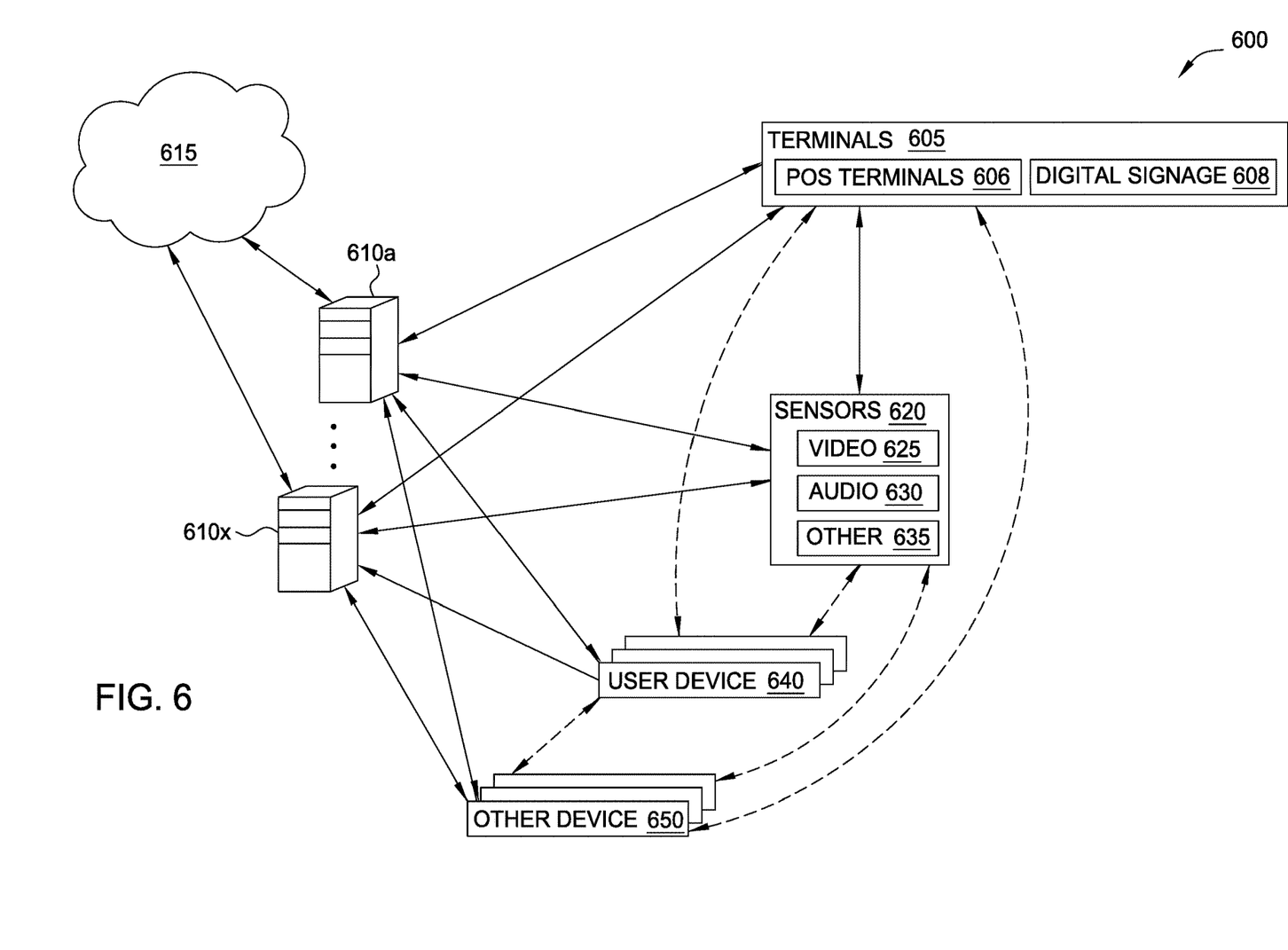
FIG. 6 illustrates exemplary equipment used in an embodiment of a POS system, according to aspects of the present disclosure.

FIG. 6 illustrates exemplary equipment used in a store 600, according to one embodiment. Store 600 may be similar to store 200. As shown, store 600 includes a plurality of terminals 605, a plurality of servers 610a through 610x coupled with a network 615, one or more sensors 620, one or more user devices 640, and one or more other devices 650.

Terminals 605 receive input from customers and/or produce output to customers within the store 600. According to aspects of the disclosure, terminals 605 may identify items for purchase, as described above. The terminals 605 may include computing systems, portions of computing systems, or devices controllable by computing systems, including the POS terminals 205 shown in FIG. 2. In one example, a terminal may include a computing device, a video display, audio speaker(s), a keyboard, and a mouse. In another example, a terminal may include a video display and associated driver hardware, but a computing device coupled to the terminal and providing data for display is disposed separately from the terminal.

In some embodiments, terminals 605 may be implemented as standalone devices, such as a POS terminal (e.g., POS terminals 205 shown in FIG. 2) on the store floor or a device on a shelf or platform. In some embodiments, terminals 605 may be integrated partially or wholly with other components of the store 600, such as input or output devices included with shelving or other structural components in the store (e.g., components used for product display or storage). In some embodiments, terminals 605 may be modular and may be easily attached to elements of the store 600, such as walls or shelves.

Generally, terminals 605 may be distributed throughout the store 600 and may enhance various phases of the shopping experience for customers. For example, terminals 605 may include digital signage 608 in the store, such as in or near aisles, endcaps, displays, and/or shelving. Terminals 605 may also include POS terminals 606 that provide a checkout functionality, allowing the customer to complete his/her shopping transaction (e.g., make payment for selected items). In some embodiments, terminals 605 may provide an integrated functionality. For example, the terminals may function in one mode as digital signage, and when a terminal is engaged by a customer, the engaged terminal functions as a POS terminal.

Servers 610a through 610x generally include processors, memory, and communications capabilities, and may identify items for purchase and customers using imagery, as described above. Servers 610a through 610x communicate using various wired and/or wireless communications methods with terminals 605, sensors 620, and with other networked devices such as user devices 640 and other devices 650. The servers 610a through 610x may identify items for purchase and customers based on information received from terminals 605, sensors 620, user devices 640, and other devices 650. Servers 610a through 610x generally execute computer program code in which input data is received from networked devices, the input data is processed and/or stored by the servers, and output data is provided to networked devices for operation of the store 600.

Sensors 620 may include video sensors 625, audio sensors 630, and other sensors 635. The other sensors 635 generally include any sensor capable of providing meaningful information about customer interactions with the store, e.g., location sensors, weight sensors, and so forth. Information from the sensors 620 may be used by a POS system in identifying items for purchased and customers. Sensors 620 may be deployed throughout the store 600 in fixed (e.g., sensor modules 202 and POS terminals shown in FIG. 2) and/or movable locations. For example, sensors 620 may be mounted in walls, floors, ceilings, displays, or other devices or in shopping carts or baskets. In one embodiment, sensors 620 may include adjustable position sensor devices, such as motorized cameras attached to a rail, wire, or frame. Sensors 620 may also include devices in user devices 640 or other devices 650 (which in some cases may include body-worn or carried devices). The user devices 640 generally include devices owned or possessed by customers, while the other devices 650 generally include devices owned by the retailer or other administrator of the store 600. In some cases, store employees may carry and use other devices 650. User devices 640 and other devices 650 may execute applications or other program code to supply information regarding items for purchase and customers that may be used by a POS in identifying the items for purchase and the customers.

Figure 7:
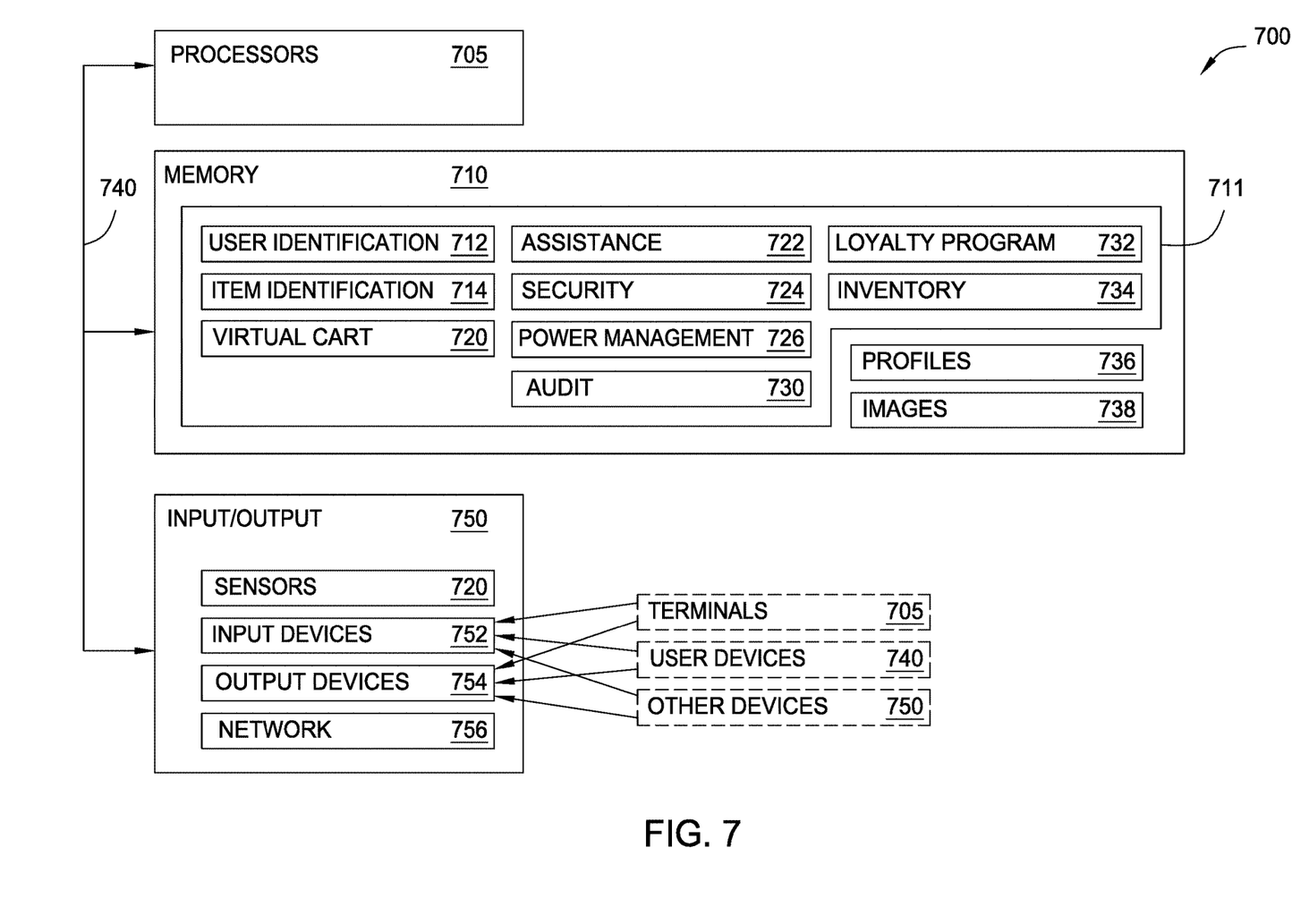
FIG. 7 is a schematic of an exemplary POS system, according to aspects of the present disclosure.

FIG. 7 illustrates an exemplary POS system 700, according to aspects of the present disclosure. Generally, the POS system 700 corresponds to the store 600 described above. POS system 700 may identify items for purchase and customers, as described above. The POS system 700 includes one or more processors 705, memory 710, and input/output subsystem 750, which are interconnected using one or more connections 740. In one embodiment, the POS system 700 may be included in a single computing device, and the connection 740 may be a common bus. In other embodiments, the POS system 700 is distributed and includes a plurality of discrete computing devices that are connected through wired or wireless network techniques. Processors 705 may be included in a single computing device, or may represent processing elements aggregated across a number of networked devices, such as mobile computing devices 245 and user devices 640 (see FIGS. 2 and 6) and terminals 605 (see FIG. 6).

Memory 710 may be included in a single computing device or may represent an aggregation of memory included in networked devices. Memory 710 may include a plurality of modules 711 for identifying items for purchase and customers, as described herein. The modules 711 store program code that is executable by one or more of the processors 705. As shown, modules 711 include user identification module 712, item identification module 714, virtual cart module 720, assistance module 722, security module 724, power management module 726, audit module 730, loyalty program module 732, and inventory module 734. The modules 711 may also interact to perform certain functions. For example, a virtual cart module 720, during operation, may make calls to a user identification module 712 to identify a customer so that the virtual cart module can charge the customer for purchased items. The modules provided here are not intended to be an exhaustive list, and different functions may be assigned to different modules.

Memory 710 may also include customer profiles 736 and customer images 738, which may be accessed and modified by the modules 711 in order to identify customers and items for purchase. For example, virtual cart module 720 may access customer profiles 736 to determine a customer's previous purchases and use the previous purchase information in identifying items for purchase. The customer profiles 736 and customer images 738 may be stored within one or more databases on the servers 610a through 610x or on a database separate from the store 600.

Input/output (I/O) functions for the POS system 700 may be provided by an I/O subsystem 750 that may include a number of different devices that are capable of interfacing with computing devices and/or with the greater store. The POS system 700 may use information received from the I/O subsystem 750 in identifying items for purchase and customers, as described herein. I/O subsystem 750 includes sensors 620, described above. I/O subsystem 750 may include input devices 752 and output devices 754 operable to interact with customers. In some embodiments of the present disclosure, POS terminals 105, terminals 605, user devices 640, and other devices 650 may include visual displays and/or audio speakers (examples of the output devices 754), and various input devices 752 (such as cameras, keyboards or keypads, touchscreens, buttons, inertial sensors, etc.). Imagery and other information received from input devices may be used by the POS system 700 in identifying items for purchase and customers. I/O subsystem 750 may further include wired or wireless connections to an external network 756 using I/O adapter circuitry. Network 756 may include a local area network (LAN), a general wide area network (WAN), and/or a public network (e.g., the Internet). In one embodiment, various networked computing devices of the POS system 700 are interconnected using a LAN, and one or more computing devices (e.g., servers 610a through 610x and user devices 640) include connections to the Internet.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of completing a sale transaction, the method comprising:
   authenticating an identity of a customer at an entrance of a store environment;
   acquiring images using one or more cameras in the store environment outside a checkout area of the store environment, wherein one or more items are represented in the images;
   identifying, by one or more processors communicatively coupled with the one or more cameras, the one or more items while being transported by the customer through the store environment;
   maintaining, by the one or more processors, a virtual shopping cart associated with the customer, wherein maintaining the virtual shopping cart comprises updating a list of selected items using the identified one or more items; and
   responsive to authenticating the sale transaction, charging a cost of the selected items to a payment method having a predefined association with the customer.

2. The method of claim 1, wherein authenticating the sale transaction occurs using a mobile computing device of the customer.

3. The method of claim 1, wherein authenticating the sale transaction occurs at the checkout area.

4. The method of claim 3, wherein authenticating the sale transaction at the checkout area comprises at least one of the following:
   identifying the customer using one or more other cameras in the store environment at the checkout area;
   identifying the customer using a voice sample acquired by a microphone disposed at the checkout area;
   detecting a mobile computing device of the customer using a wireless network receiver disposed at the checkout area; and
   detecting a predefined pass-code associated with the customer by the microphone.

5. The method of claim 1, wherein authenticating the identity of the customer occurs using at least one of the following:
   one or more other cameras in the store environment at the entrance; and
   a mobile computing device of the customer.

6. The method of claim 5, wherein the one or more other cameras are included in a kiosk disposed at the entrance.

7. The method of claim 1, wherein authenticating the identity of the customer comprises:
   registering the customer in a database.

8. A computer program product for completing a sale transaction, the computer program product comprising:
   a computer-readable storage medium having computer-readable program code, the computer-readable program code executable by one or more computer processors to perform an operation that comprises:
      authenticating an identity of a customer at an entrance of a store environment;
      acquiring images using one or more cameras in the store environment outside a checkout area of the store environment, wherein one or more items are represented in the images;
      identifying the one or more items while being transported by the customer through the store environment;
      maintaining a virtual shopping cart associated with the customer, wherein maintaining the virtual shopping cart comprises updating a list of selected items using the identified one or more items; and
      responsive to authenticating the sale transaction, charging a cost of the selected items to a payment method having a predefined association with the customer.

9. The computer program product of claim 8, wherein authenticating the sale transaction occurs using a mobile computing device of the customer.

10. The computer program product of claim 8, wherein authenticating the sale transaction occurs at the checkout area.

11. The computer program product of claim 10, wherein authenticating the sale transaction at the checkout area comprises at least one of the following:
    identifying the customer using one or more other cameras in the store environment at the checkout area;
    identifying the customer using a voice sample acquired by a microphone disposed at the checkout area;
    detecting a mobile computing device of the customer using a wireless network receiver disposed at the checkout area; and
    detecting a predefined pass-code associated with the customer by the microphone.

12. The computer program product of claim 8, wherein authenticating the identity of the customer occurs using at least one of the following:
    one or more other cameras in the store environment at the entrance; and
    a mobile computing device of the customer.

13. The computer program product of claim 12, wherein the one or more other cameras are included in a kiosk disposed at the entrance.

14. The computer program product of claim 8, wherein authenticating the identity of the customer comprises:
    registering the customer in a database.

15. A system for completing a sale transaction, the system comprising:
    one or more computer processors;
    a memory containing program code which, when executed by the one or more computer processors, causes the system to perform an operation comprising:
       authenticating an identity of a customer at an entrance of a store environment;
       acquiring images using one or more cameras in the store environment outside a checkout area of the store environment, wherein one or more items are represented in the images;
       identifying the one or more items while being transported by the customer through the store environment;
       maintaining a virtual shopping cart associated with the customer, wherein maintaining the virtual shopping cart comprises updating a list of selected items using the identified one or more items; and
       responsive to authenticating the sale transaction, charging a cost of the selected items to a payment method having a predefined association with the customer.

16. The system of claim 15, wherein authenticating the sale transaction occurs using a mobile computing device of the customer.

17. The system of claim 15, wherein authenticating the sale transaction occurs at the checkout area.

18. The system of claim 17, wherein authenticating the sale transaction at the checkout area comprises at least one of the following:

identifying the customer using one or more other cameras in the store environment at the checkout area;

identifying the customer using a voice sample acquired by a microphone disposed at the checkout area;

detecting a mobile computing device of the customer using a wireless network receiver disposed at the checkout area; and detecting a predefined pass-code associated with the customer by the microphone.

19. The system of claim 15, wherein authenticating the identity of the customer occurs using at least one of the following:

one or more other cameras in the store environment at the entrance; and a mobile computing device of the customer.

20. The system of claim 19, wherein the one or more other cameras are included in a kiosk disposed at the entrance.

\* \* \* \* \*